3,442,605
CONTINUOUS COUNTER-CURRENT WASHING SYSTEM BY THICKENER METHOD
Matajiro Osaka, Izumi-gun, Toyama-ken, Hidetaka Uoda, Shinminato-shi, Shigeo Horii, and Minoru Okuda, Toyama-shi, Japan, assignors to Fuji Kagaku Kogyo Kabushiki Kaisha, Toyama-ken, Japan, a company of Japan
Filed July 16, 1965, Ser. No. 472,605
Int. Cl. C01b *33/22, 33/26*
U.S. Cl. 23—110          3 Claims

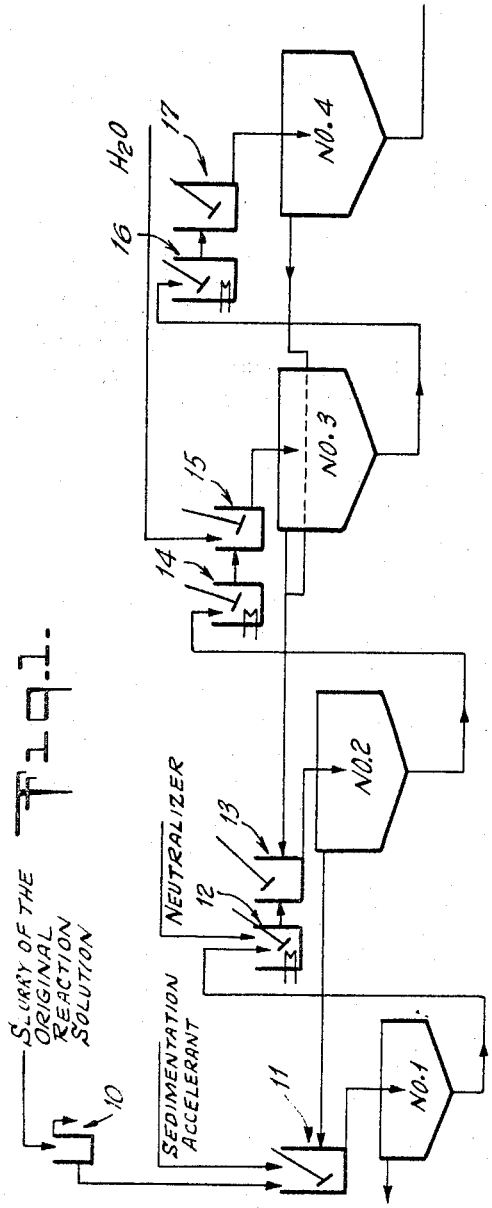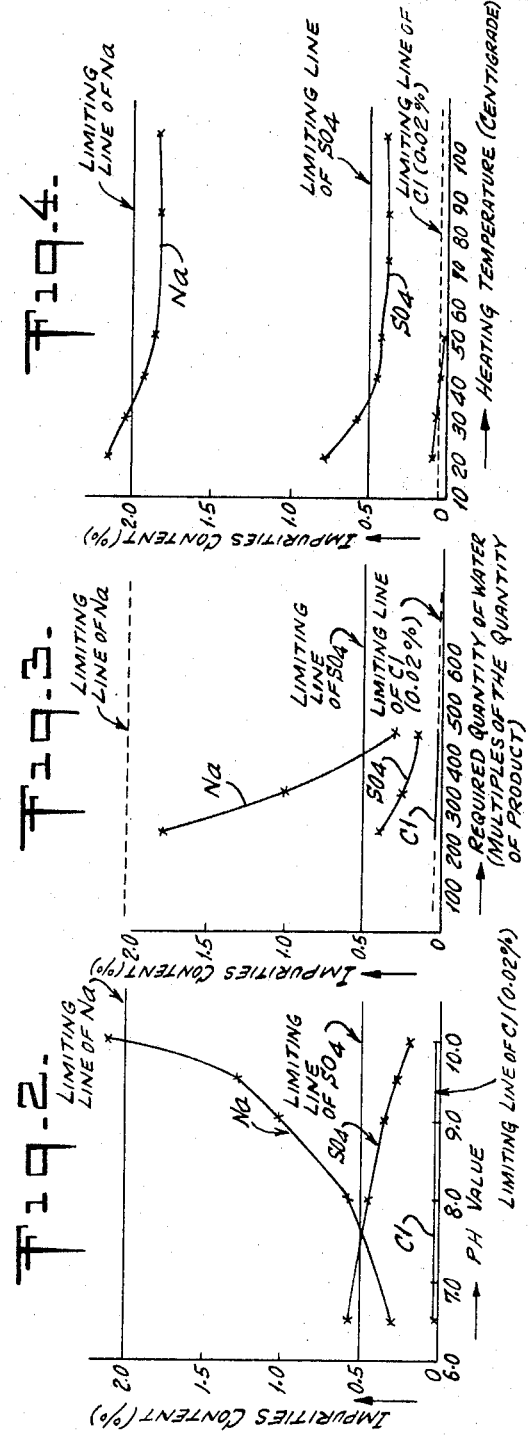

ABSTRACT OF THE DISCLOSURE

Materials of the group consisting of magnesium aluminosilicates, magnesium trisilicate and aluminum silicates are purified by adjusting the pH of the reactant mixture therefor in colloidal suspension form to respective values of 6.5 to 10, 7.5 to 9.5 and 5.0 to 7.0, adding caustic starch to the suspension as a precipitation promoting agent to precipitate a sludge containing the respective silicate, subjecting the sludge to counter current washing and drying the sludge.

---

The present invention relates to a process for refining of silicates to be used for medical uses as antacid agent.

Silicates such as synthetic aluminum silicate, magnesium trisilicates, etc. have been medically used as antacid agent for centuries. Among the more recent aluminum silicates which have found wide acclaim not only in Europe and America as well as in Japan, but throughout the world, we mention magnesium aluminosilicate, because it has an excellent acid neutralizing power, producing an immediate and yet lasting effect; without causing any adverse effect it is also very stable in quality without changing with time.

These silicates, however, are produced from an alkaline reaction solution as sludgy precipitate which is of amorphous form of fine particle size, and has high absorptive capacity. These materials have been so far purified by repeated decantation with water containing mineral acid or mineral acid salts and a great deal of water, due to the large amounts of liquid, the operation inevitably gets cumbersome and a long time is needed to finish the precipitation, thereby making it impossible to put the abovementioned system into operation for industrial purposes.

For example, in case of refining magnesium aluminosilicate, the amount of water required is 650 to 700 times as large as the amount of the finished product, and 15 to 20 washings by agitation in a circulating system are in general required. Moreover, as the precipitate contains fine particles measuring 0.05–1 micron, the sedimentation rate is very slow; also, the sedimentation should be kept undisturbed for over twenty four hours. For this reason the washing by decantation can scarcely be done more than once a day and thus to finish the purification takes more or less 20 days. To make matters worse, turbidity often occurs due to the incapability of sedimentation, thus making the product escape through the drain, a fact, which decreases the yield considerably.

The same is true for the other silicates and in order to refine them industrially by the decantation system so far adopted, it is indispensable to set up a rather large number of washing tanks, each having a large capacity; at the same time a great deal of water, labor and time are required. It is therefore quite impossible to apply such decantation system to refine the silicates on an industrial scale for medical purposes.

The inventors of this invention have studied extensively to seek out an industrially advantageous method of purification suitable for mass production, overcoming the bottlenecks described above and have succeeded in discovering this new process of inventive step, by which satisfactory silicates can be readily and successively produced industrially in quantities by washing the slurry produced from the silicates by reaction through the continuous-flowing washing method named thickener washing system, wherein pH range of the sludge obtained is being controlled within the fixed limits by the use of mineral acid salts or the solution of mineral acid salts of metallic atoms that are the constituents of the silicates in question, while the current of washing water or sludge being regulated, with or without heating.

It is desirable that the thickeners to be used to put this invention into operation be a combination of two or more tanks, and a combination of two to four tanks is the most economical. For a better understanding of the invention, its operating advantages and the specific objects attained by its use, reference should be had to the accompanying drawing and description in which:

FIG. 1 shows an example of the apparatus suitable for carrying out the present invention.

FIG. 2 shows the relation between pH value of magnesium aluminosilicate produced at the time of the reaction being completed and the amount of the impurities contained in the product. FIG. 3 shows the relation between the amount of water required for washing and the amount of the impurities contained in the magnesium aluminosilicate.

FIG. 4 is an illustration showing the relation between temperature needed to wash magnesium aluminosilicate by heating and the amount of the impurities contained in the product.

FIG. 1 shows an example of the washing apparatus of a thickener system comprising 4 tanks with scrapers suitable for executing this invention. The slurry of the silicates created by reaction is supplied into the tank with fixed water level 10, is then poured regularly in fixed quantity into mixing tank 11, and is further mixed by agitation with overflowing liquid from thickener No. 2, while a fixed quantity of the accelerant for precipitation is poured into the tank having a pump with measuring gauge. This slurry is then led into thickner No. 1, where it is divided into sludge and overflowing liquid. This overflowing liquid is released and the sludge is left there till the solids in it become 6 to 8 percent in density, thereafter it is delivered into heating tank 12 in a fixed quantity; it may either be heated or left unheated; the neutralizer referred to above is then added to control the pH value of the sludge and adjust it as desired. This neutralization is automatically controlled by the pH-meter. The sludge is further delivered into mixing tank 13, mixed with overflowing liquid from thickeners No. 3 and No. 4, and enters into thickener No. 2, where the same separation as in No. 1 is performed. The overflowing liquid is passed into mixing tank 11, and the sludge enters heating tank 14, where it is heated, or left unheated, as desired. Thereafter, the sludge enters mixing tank 15 and is washed and mixed with one half of the water required. Then it is equally subjected to the separation in thickener No. 3 and the overflowing liquid is sen into mixing tank 13 and the sludge into heating tank 16, where it is heated or left unheated. Next, it enters mixing tank 17, and is washed and mixed with one half of the water required so that the whole quantity of water corresponds to the present amount in both vessels. In tank No. 4 the sludge is subjected to the same separation as mentioned above and the overflowing liquid is mixed with overflow from thickener No. 3 and enters mixing tank 13. Here the precipitated sludge is completely purified and is filtered, dried, pulverized, and strained to yield the finished product.

In performing the continuous current washing method through thickener system, the most important points are the selection of the precipitation-accelerator and the control of the pH range. The sedimentation rate goes hand in hand with the increasing velocity of the overflow in the thickneners and therefore, with the washing efficiency as well, and the pH control has an effect either on the chemical composition or on the purity of the product.

As the precipitation-accelerants for the magnesium aluminosilicate, caustic starch, alginic acid salts and silica gel can be used, but caustic starch is the most economical, which is added to the whole quantity of the liquid at 5–10 p.p.m. In case of magnesium trisilicate or aluminum silicate, magnesium salts at 100–1,000 p.p.m. of the whole quantity of the liquid and aluminum sulfate at 5–50 p.p.m. are most favorably used.

Generally speaking, it takes a long time to complete the reaction of the silicates and when the old decantation system by batch is employed, it is therefore very hard to obtain a product having a fixed chemical composition, as each washing operation produces only a small quantity and the alkali passed into the solution should be gradually eliminated by neutralization. If the above mentioned steps are not carried out carefully the composition of the product will not be uniform, which renders the process complicated, because much labor will be required and the quality control will also be troublesome.

On the other hand, in the process of the present invention the sludge delivered from the first thickener into the first heating tank 12 is controlled only once within the fixed pH range, according to the kinds of the silicates to be produced and thereafter is continuously being washed till the final product is obtained, while the pH value is automatically lowered and the neutralization is performed. Thus, when the reaction is completed, the product having a fixed composition is always obtained, thus saving labor considerably and simplifying the quality control.

The inventors have confirmed after repeated experiments that the most satisfactory result is obtained when pH value in heating tank 12 is controlled within the range indicated below, and that if neutralization is performed beyond these limits, the impurities in the product exceed the allowable limits and the amount of water required for cleaning is also increased.

|  | pH |
|---|---|
| Magnesium aluminosilicate | 6.5–10.0 |
| Magnesium trisilicate | 7.5–9.5 |
| Aluminum silicate | 5.0–7.0 |

Neutralization can be done not only in the sludge that is taken out of thickener No. 1, but also in the original reacted slurry as well as in the sludge in thickeners No. 2, No. 3 and No. 4. But in the originally reacted slurry the neutralizer is substantially consumed for neutralizing an excess of free alkali, and a part of the materials sometimes escapes. Also, when neutralizing the sludge that comes out of thickeners No. 2, No. 3 and No. 4, it often happens that the organic ion in the neutralizer employed is hard to remove.

As neutralizer, the mineral acid salts such as sulfuric acid, hydrochloric acid and or the mineral acid salts of metallic atoms that are the constituents of the silicates in question e.g. aluminum sulfate, aluminum chloride, magnesium sulfate and magnesium chloride, can be used singly or in combination of two or more. As for magnesium aluminosilicate, when aluminum salts such as aluminum sulfate and aluminum chloride are used as neutralizer, it is best for neutralization to control the pH value at 6.5–10.0. If neutralized up to a pH of over 10.0, sodium content in the product becomes greater and if, on the contrary, the product is neutralized at a pH below 6.5, sulfate content is increased, which is undesirable.

FIG. 2 shows the relation between the pH value and the impurities contained in the product when the aluminum sulfate solution is used as neutralizer in heating tank 12 and tap water of 350 times the volume of the proudct is used for continuous current washing. The overflowing liquid from thickener No. 1 is alkaline at a pH of 12–13 and there are little silica and magnesium ions removed by washing, but as for aluminum about 10% of the amount of materials employed generally are carried off in the form of sodium aluminate. Accordingly, when neutralization is performed by the aluminum salts, aluminum ion remains in the structure of the product, which is favorable to maintain the mol ratio of the product. When mineral acid salts are used as neutralizer, it is advisable that the quantity of aluminum salts used as materials be increased by 5–15% when reaction and that the quantity of caustic soda that corresponds to them be proportionately increased.

In case of magnesium trisilicate, it is best that first sludge be neutralized to a pH of 7.5–9.5 by the mineral acid salts such as sulfuric acid or hydrochloric acid, in which case a part of magnesium and silicate ions is isolated and the sludge is mixed and washed with tap water and enters thickener No. 2. Consequently, the overflowing liquid from that thickener contains free magnesium and silicate ions, which is mixed with originally reacted solution of alkalinity in mixing tank 11, where a pH value becomes about 11. Further, as magnesium chloride is added to it as precipitation-accelerant, free magnesium and silicate ions are all bound by magnesium hydroxide which is produced by the accelerant, settled and collected in the sediment. Accordingly, there is no loss of magnesium ion.

In case of aluminum silicate, it is most adequate for neutralization to use aluminum salts such as aluminum sulfate and aluminum chloride and it is also practicable to control the amount of alkali in sodium silicate used as raw material and react it with sulfates to obtain a pH value of 5–7.0. In that case, it is generally unnecessary to neutralize the sludge.

In the event that pH value of the sludge in thickener No. 1 is controlled in such a manner as described above and the flow speed of the washing water or sludge is adjusted to remain constant, the current washing is continuously carried on and the silicates are well refined, the amount of washing water needed being remarkably curtailed, thereby which corresponds to about one half or one third of that required for the old decantation system.

FIG. 3 shows the test result obtained when the relation between the quantity of water needed and the purified grade of the product is seeked after as to the magnesium aluminosilicate on the conditions shown in the following table, using the continuous-current washing system as is shown in FIG. 1, with the percentage of the impurities content in the product such as Na, SO₄, Cl as a guide.

| Amount of water required (indicated in multiples of the amount of product) | 250 | 350 | 500 |
|---|---|---|---|
| Heating temperature in each heating tank, °C | 80 | 15 | 15 |
| pH value at the time of neutralization in heating tank 12 | 9.5 | 9.3 | 8.0 |

FIG. 4 shows the efficiency obtained when the sludge is neutralized with aluminum sulfate at a pH of 9.5 in heating tank 12 and all the heating tanks are heated, using the water of 250 times volume of the product, as to the magnesium aluminosilicate in the same apparatus.

In this way, as impure silicates are purified by the continuous-current washing system in the present invention, the efficiency of water used is outstandingly enhanced and especially notable heating and washing effects are obtained, thus saving the quantity of water required remarkably as compared with the old method. Especially, as the heating and washing efficiency is enhanced notably, much more water can be curtailed than in the old method.

The advantages of this invention are outlined as follows:

(1) The amount of water required can be reduced to one half to one third of that of the old method. This is an advantage not to be ignored, since the amount of water required is hundreds of times that of the product.

(2) The apparatus is extremely simple in construction, easy to operate in succession and needs no building to house it, since it can be operated in the open air.

(3) As the operation can be carried on consecutively, the automation system is easily introduced and much manpower can then be saved. For instance, in case of magnesium aluminosilicate, 30 men a day are required for the production of 1,000 tons a year by the old method, whereas by the method of this invention only 3 men a day are enough to turn out the same quantity.

(4) As the operation of this invention is continuously carried on with automation system under a fixed condition, there is little lack of uniformity of quality of the product, purity of the product is improved and there is no possibility of the dust intermixed in the product.

(5) With the use of precipitation-accelerant the fine particles are effectively collected, thus lessening the loss of product very much and increasing the yield.

As described above, this invention offers a very efficient industrial method of refining the silicates for medical uses, which has a great significance in this field.

Example No. 1

To 515 liters of aluminum sulfate containing 380 grams ($Al_2(SO_4)_3 \cdot 18H_2O$ per liter) 134 liters of caustic soda solution containing 730 grams per liter NaOH are added and stirred; when the mixture becomes clear, 250 liters of sodium silicate solution containing 120 grams $SiO_2$ and 60 grams $Na_2O$ per liter are added and stirred. The precipitate of sodium aluminum silicate is then produced while mixed solution becomes turbid in white. Then, 180 liters of magnesium chloride solution containing 333 grams $MgCl_2 \cdot 6H_2O$ per liter is added and stirred, in which case the precipitate of magnesium aluminum silicate is produced and stirred to produce a slurry in solution, whose mol ratio of $Al_2O_3:MgO:SiO_2$ is 1:1:1.7 and whose density is 8 percent. This slurry is passed into mixing tank 12 of the continuous-current washing system, having four thickeners each measuring 6 meters in diameter and 2 meters in height, as shown in FIG. 1, the rate of flow of the slurry is 0.7 ton per hour. Tap water is admitted into mixing tanks 15 and 17 respectively at the rate of 12.25 tons per hour; this adds up to 24.5 tons per hour, which is 350 times the amount of the product, the two tanks are connected with each other, so that slurry and tap water can flow through all the way. As precipitation-accelerant, 0.5 percent of caustic starch solution is poured into mixing tank 11 at the rate of 24.5 liters per hour and the time of staying of the sludge is regulated in order that the percentage of solids in each thickener will be 6 to 10 percent (3 to 4 hours).

To neutralize the sludge in heating tank 11, aluminum sulfate solution (300 grams $Al_2(SO_4)_3 \cdot 18H_2O$ per liter) is used and a pH is adjusted to 9.0, which is automatically controlled by a pH meter. No external heating takes place in each heating tank. Under such conditions as described above, the original slurry-containing solution is washed first in thickner No.1 and thereafter in thickeners No. 2, No.3 and No.4 by turns, and the sludge produced in thickener No.4 is then filtered by the filter-press. The cake thus obtained is instantaneously dried and pulverized by a flash dryer with a hot blow of 250° C. and the powder is finally collected in a cyclone and bag filter. This powder is sieved through a 100-mesh screen to make the final product. The acid consuming capacity of the product is 230, the mole ratio of its composition of $Al_2O_3$ to MgO to $SiO_2$ is 1:1:1.7 and the percentage of impurities content is 0.3% for $SO_4$, 1.1% for Na and nil for Cl. The composition of the overflowing solution from thickener No. 1 which is discarded, is 50 p.p.m. for $Al_2O_3$, 2 p.p.m. for MgO and 1 p.p.m. for $SiO_2$, and in view of the fact that the composition of the product is equal to that of the original reaction solution, it is proved that the amount of $Al_2O_3$ which is lost from the overflowing liquid is recovered by aluminum sulfate used as neutralizer and that the yield remains unchanged.

Example No. 2

To 900 liters of aluminum sulfate solution containing 380 grams $Al_2(SO_4)_3 \cdot 18H_2O$ per liter, 624 liters of caustic soda solution, 333 g./l., NaOH is added little by little with agitation to convert them into sodium aluminate, to which 624 liters of magnesium chloride solution 333 g./l. $MgCl_2 \cdot 6H_2O$ is added and stirred to convert them into monobasic magnesium aluminate. Thereafter, 250 liters of sodium silicate solution (120 g. $SiO_2$ 60 $Na_2O$ g./l. are added with strong agitation and are then left for about 4 hours to obtain the original reaction solution, whose mole ratio of $Al_2O_3$ to MgO to $SiO_2$ is 1:2:1. This solution is washed in the continuous current washing apparatus comprising three thickeners (exclusive of No. 4 thickener, thus one less than the apparatus described in Example 1; also omitted are heating tank No. 3 and mixing tank 17 from that apparatus. The original reaction in heating tank 14 and No. 4 mixing 0.5 ton per hour, while tap water is added into mixing tank 15 at the rate of 250 tons per hour. 0.5% of caustic starch solution is supplied in mixing tank 11 only at the rate of 25 liters per hour as precipitation accelerator and the residence time in each thickener is so regulated that the density of the sludge will be 6 to 10 percent. The neutralization of the sludge in heating tank 12 is carried out with 0.1 N hydrochloric acid to adjust a pH at 7.5, which is automatically controlled by a pH meter and each heating tank is heated to 50° C. Under these conditions the originally reacted slurry is washed firstly in thickener No.1 and then in turn in thickeners No. 2 and 3. The obtained sludge from thickener No. 3 is filtered by the filter-press to form the cake, which is dried, pulverized and sieved through a 100-mesh screen to obtain the finished product. When analyzing the product, the results are as follows: the mole ratio of the composition of $Al_2O_3$ to MgO to $SiO_2$ is 1:2:1, the impurity content is 0.2% for Na, 0.4% for $SO_4$ and nil for Cl, the acid consuming capacity is 270 cc. It should be noted that the acid consuming capacity is measured by the antacidity test prescribed in USP for dried aluminum hydroxide gel, which represents the amount of 0.1 N hydrochloric acid consumed by 1 gram of the antacid in milliliter.

Example No. 3

To 1,240 liters of sodium silicate solution containing 145 grams $SiO_2$ and 124 grams NaO per liter, 1,220 liters of magnesium chloride solution ($MgCl_2 \cdot 6H_2O$ 333 g./l.) are added and agitated for about 30 minutes, wherein the precipitate of magnesium trisilicate is formed which is used as the originally reacted solution. In this example mixing tank 11, thickener No. 1, heating tank 12, mixing tank 13 and thickener No. 2 of among the apparatus shown in Example 1 are used. The originally reacted solution is passed into mixing tank 11 at the rate of 0.7 ton per hour and tap water is added into mixing tank 13 at the rate of 10 tons per hour in succession, and are mixed with one another. Magnesium chloride solution containing 500 grams ($MgCl_2 \cdot 6H_2O$) per liter is poured into mixing tank 11 at the rate of 10 liters per hour as a precipitation accelerant. The $MgCl_2 \cdot 6H_2O$ is added at the rate of 500 p.p.m. of the total quantity of the solution. The residence time of the sludge in each thickener is so regulated that the percentage of solids will be 7 to 10 percent (6 to 10 hours). In heating tank 12 hydrochloric acid (36 w./w. percent) is added and stirred to keep a pH value at 8.0. The volume of hydrochloric acid to be added is automatically controlled by the pH meter. The thus obtained sludge is mixed and washed with water in mixing tank 13, and the so refined sludge and the overflowing water are separated in thickener No. 2. Thereafter, the sludge is filtered with the filter-press and is further washed with water. The filtrate is dried by the flash dryer as shown in Example 1 to obtain the final product, which corresponds to the standards specified in U.S.P.; the mole ratio of the composition is 2:3 of MgO to $SiO_2$ and the acid consuming capacity is 150 cc. on an anhydrous basis (the standard of antacidity specified in U.S.P. is 140 to 160 milliliter).

Example No. 4

To 1,800 liters of sodium silicate solution $SiO_2$ 100 grams and 344 grams $Na_2O$ per liter, 500 liters of aluminum sulfate solution ($Al_2(SO_4)_3 \cdot 18H_2O$ 400 g./l.) are added by dropping and stirring for half an hour, wherein the precipitate of aluminum silicate is produced and is used as the original reaction solution, whose pH value is 5.4. In this example the continuous current washing apparatus as shown in Example 1 is employed. That is, the original reaction solution is placed in mixing tank 11 at the rate of 0.82 ton per hour, while tap water is added to mixing tanks 15 and 17 at the rate of 7.5 tons per hour respectively, a total of 15 tons per hour is passed therethrough. The aluminum sulfate solution containing 400 grams ($Al_2(SO_4)_3 \cdot 18H_2O$) per liter is added to mixing tank 11 as the precipitation accelerant, the volume of which is to be 20 p.p.m. of the total quantity of the solution. Neither neutralization in heating tank 12 nor heating in each heating tank are carried out in this example. Under such conditions the solution is washed by the continuous current washing system as shown in Example 1 and the sludge obtained in thickener No. 4 is filtered and dried to obtain the final product. The mole ratio of the composition is 1:10 of $Al_2O_3$ to $SiO_2$. The product meets the standards specified for synthetic aluminum silicate in the Japanese Pharmacopoeia. The acid consuming capacity is 55 cc. (the antacidity specified in Japanese Pharmacopoeia is more than 50 milliliter).

What we claim is:

1. A method for the purification of magnesium aluminosilicate, which comprises reacting caustic soda and sodium silicate with a sol consisting essentially of water soluble aluminum salt and water soluble magnesium salt to produce a colloidal suspension, adjusting the pH of said suspension to a value of from 6.5 to 10, adding caustic starch as a precipitation promoting agent to the suspension to precipitate a sludge containing said magnesium aluminosilicate, subjecting said sludge to a continuous counter current washing and then draining the sludge.

2. A method for the purification of a magnesium trisilicate, which comprises reacting aqueous solution of water soluble magnesium salt with caustic soda and sodium silicate to produce a colloidal suspension, adjusting the pH of said suspension to a value of from 7.5 to 9.5, adding caustic starch as a precipitation promoting agent to the suspension to precipitate a sludge containing said magnesium silicate, subjecting said sludge to a continuous counter current washing, and then draining the sludge.

3. A method for the purification of an aluminum silicate, which comprises reacting an aqueous solution of water soluble aluminum salt with caustic soda and sodium silicate, to produce a colloidal suspension adjusting the pH of said suspension to a value of from 5.0 to 7.0, adding caustic starch as a precipitation promoting agent to the suspension to precipitate a sludge containing said aluminumsilicate, subjecting said sludge to a continuous counter current washing, and then draining the sludge.

References Cited

UNITED STATES PATENTS

| | | | |
|---|---|---|---|
| 1,254,230 | 1/1918 | Jackson | 23—110 |
| 1,604,427 | 10/1926 | Spicer | 23—312 |
| 1,945,534 | 2/1934 | Rembert | 23—10 |
| 1,957,182 | 5/1934 | Schaus | 23—310 |
| 2,970,889 | 2/1961 | Ishino et al. | 23—110 |
| 2,990,247 | 6/1961 | Conard et al. | 23—110 |
| 3,032,394 | 5/1962 | Ishino et al. | 23—110 |
| 3,272,594 | 9/1966 | Uyeda | 23—110 |
| 3,288,599 | 11/1966 | Keyes | 23—312 |
| 3,310,373 | 3/1967 | Johnson | 23—110 |
| 3,337,307 | 8/1967 | Kuster | 23—310 X |

OTHER REFERENCES

The Chemical Process Industries: Shreve, 1945, New York, pp. 165 and 166.

WILBUR L. BASCOMB, JR., *Primary Examiner.*

U.S. Cl. X.R.

23—270, 310, 312; 167—55; 209—5